(12) United States Patent
Kubo et al.

(10) Patent No.: US 11,835,370 B2
(45) Date of Patent: Dec. 5, 2023

(54) METHOD FOR CALCULATING POSITION OR ANGLE OF INSPECTION TARGET, STORAGE MEDIUM, APPARATUS, AND SYSTEM

(71) Applicant: CANON KABUSHIKI KAISHA, Tokyo (JP)

(72) Inventors: Satoshi Kubo, Tochigi (JP); Takumi Kawamata, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/576,686

(22) Filed: Jan. 14, 2022

(65) Prior Publication Data
US 2022/0228889 A1 Jul. 21, 2022

(30) Foreign Application Priority Data
Jan. 20, 2021 (JP) .................................. 2021-007471

(51) Int. Cl.
*G01D 5/245* (2006.01)
*G01D 5/14* (2006.01)

(52) U.S. Cl.
CPC ........... *G01D 5/2454* (2013.01); *G01D 5/147* (2013.01)

(58) Field of Classification Search
None
See application file for complete search history.

(56) References Cited

U.S. PATENT DOCUMENTS

| | | | |
|---|---|---|---|
| 2008/0215661 A1* | 9/2008 | Aono | G01D 5/2448 708/530 |
| 2014/0021341 A1 | 1/2014 | Nagae | |
| 2018/0231402 A1 | 8/2018 | Okumura | |
| 2020/0408570 A1* | 12/2020 | Hayashi | G01D 5/206 |

FOREIGN PATENT DOCUMENTS

| | | |
|---|---|---|
| DE | 197 12 622 A1 | 10/1998 |
| DE | 10 2008 006 526 A1 | 7/2008 |
| JP | 2008058252 A | 3/2008 |
| JP | 2009162673 A * | 7/2009 |
| JP | 2009162673 A | 7/2009 |

OTHER PUBLICATIONS

English Translation of JP 2009162673 (Year: 2009).*

* cited by examiner

*Primary Examiner* — Douglas X Rodriguez
(74) *Attorney, Agent, or Firm* — CANON U.S.A., INC. IP Division

(57) ABSTRACT

A method for calculating a position or an angle of an inspection target based on a sine wave signal and a cosine wave signal output from an encoder or a laser interferometer, includes acquiring a temporary movement speed of the inspection target, calculating an amplitude correction value corresponding to the temporary movement speed using information representing a relationship between a movement speed of the inspection target and amplitudes of the sine wave signal and the cosine wave signal acquired in advance, correcting the amplitudes of the sine wave signal and the cosine wave signal using the amplitude correction value, and calculating an offset error in a Lissajous waveform using the sine wave signal and the cosine wave signal the amplitudes of which are corrected with the amplitude correction value and calculating the position or the angle of the inspection target using the offset error.

20 Claims, 12 Drawing Sheets

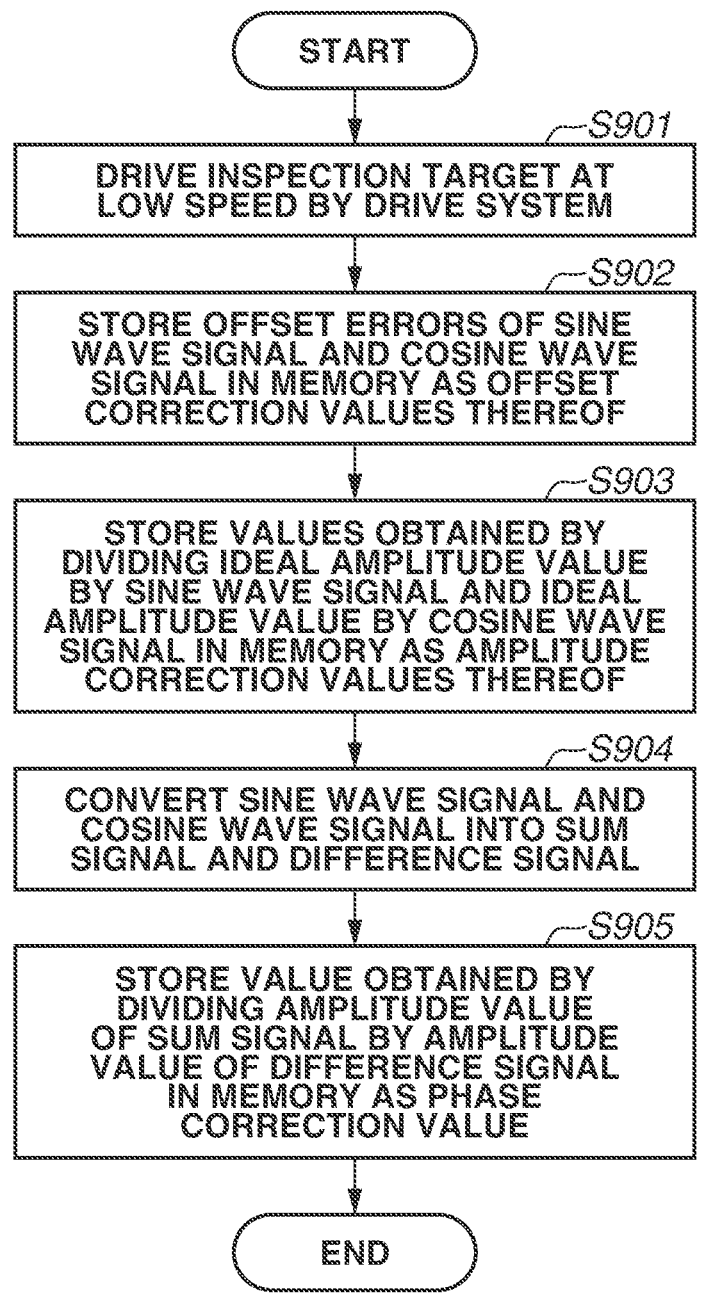

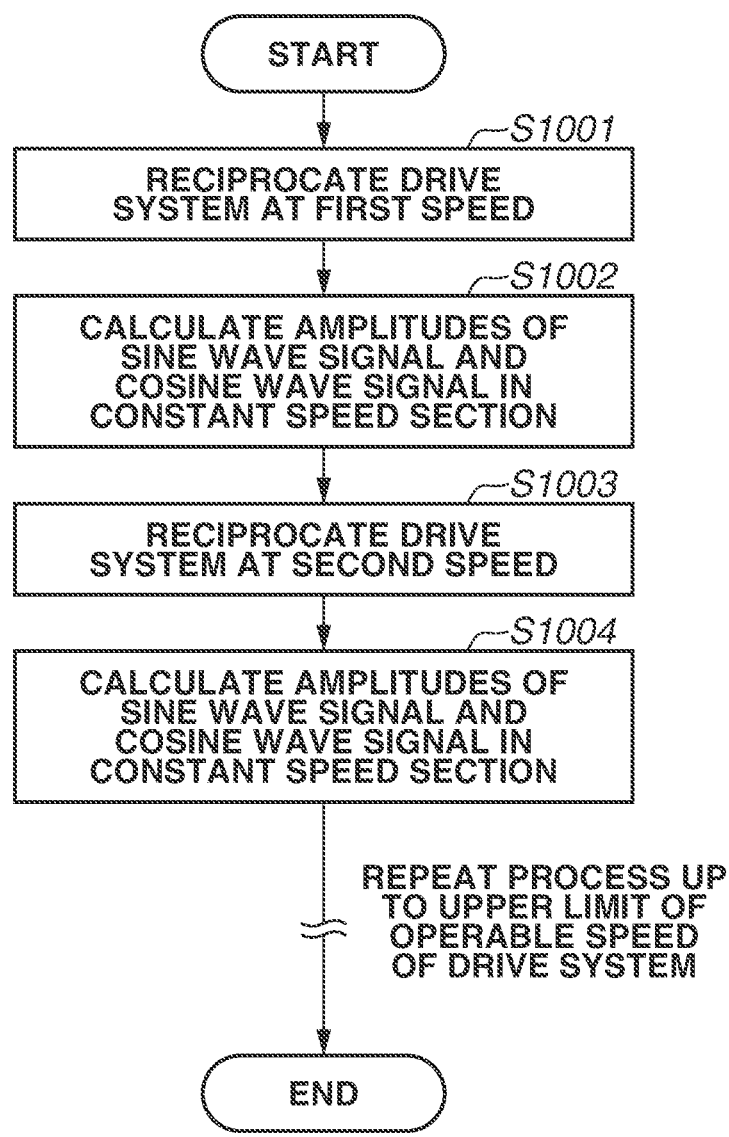

METHOD FOR CALCULATING POSITION OR ANGLE OF INSPECTION TARGET, STORAGE MEDIUM, APPARATUS, AND SYSTEM

BACKGROUND

Field of the Disclosure

The aspect of the embodiments relates to a method for calculating a position or an angle of an inspection target, a storage medium, an apparatus, and a system.

Description of the Related Art

An example of a measuring instrument for measuring a position or an angle of an inspection target is an optical encoder provided with a light source, a scale in which a reflecting portion and a non-reflecting portion are alternately arranged, and a light receiving element which receives reflected light from the scale.

If an inspection target to which the scale is attached moves, two sine waves which are substantially orthogonal to each other (hereinafter, referred to as a sine wave signal and a cosine wave signal) are output from the light receiving element attached to a stator in response to a change in a position or an angle of the inspection target. An arctangent operation (Arctan) is performed on the sine wave signal and the cosine wave signal to obtain an angle in one signal period, and the position or the angle of the inspection target is calculated from the number of signal periods and the obtained angle.

To accurately perform the arctangent operation, it is necessary to bring the sine wave signal and the cosine wave signal close to an ideal state, so that correction techniques have been conventionally developed. An encoder is systematized as an encoder correction system in cooperation with a drive system, and, for example, there is a method for calculating correction values by evaluating a sine wave signal and a cosine wave signal in a calibration process and correcting the signals continuously using the correction values.

Further, as a more advanced correction technique than the above-described one, there is a method for performing correction on a sine wave signal and a cosine wave signal during a movement of an inspection target.

As a conventional correction method of an encoder signal, there is a method for updating correction values of an offset, an amplitude, and a phase from a sine wave signal and a cosine wave signal in a case where it is determined that an inspection target moves at low speed (Japanese Patent Application Laid-Open No. 2008-58252). There is also a method for acquiring an offset by acquiring three points on a circumference of a Lissajous waveform and calculating a circumcenter (Japanese Patent Application Laid-Open No. 2009-162673).

An amplitude of a sine wave signal or a cosine wave signal changes based on a movement speed of an inspection target. If the amplitude of the sine wave signal or the cosine wave signal changes, a Lissajous waveform of the sine wave signal and the cosine wave signal is deformed, and thus it is difficult to calculate an offset error.

In the method discussed in Japanese Patent Application Laid-Open No. 2008-58252, correction can be performed in a case where it is determined that the inspection target moves at low speed, but an influence of the movement speed of the inspection target is neglected. In the method discussed in Japanese Patent Application Laid-Open No. 2009-162673, a change in the amplitude (a Lissajous waveform) of the sine wave signal or the like is not assumed.

SUMMARY OF THE DISCLOSURE

According to an aspect of the disclosure, a method for calculating a position or an angle of an inspection target based on a sine wave signal and a cosine wave signal output from an encoder or a laser interferometer, includes acquiring a temporary movement speed of the inspection target, calculating an amplitude correction value corresponding to the temporary movement speed using information representing a relationship between a movement speed of the inspection target and amplitudes of the sine wave signal and the cosine wave signal acquired in advance, correcting the amplitudes of the sine wave signal and the cosine wave signal using the amplitude correction value, and calculating an offset error in a Lissajous waveform using the sine wave signal and the cosine wave signal the amplitudes of which are corrected with the amplitude correction value and calculating the position or the angle of the inspection target using the offset error.

Further features of the disclosure will become apparent from the following description of exemplary embodiments with reference to the attached drawings.

BRIEF DESCRIPTION OF THE DRAWINGS

FIG. 4 is a flowchart illustrating a calibration process.

FIG. 6 is a flowchart illustrating processing for acquiring an amplitude characteristic.

DESCRIPTION OF THE EMBODIMENTS

Exemplary embodiments of the disclosure will be described in detail below with reference to the attached drawings.

Examples of a measuring instrument for measuring a position or an angle of an inspection target include an encoder and a laser interferometer. As an example of an encoder, there is an optical encoder provided with a light source, a scale in which a reflecting portion and a non-reflecting portion are alternately arranged, and a light receiving element which receives reflected light from the scale. The light receiving element includes a plurality of light receiving portions arranged parallel to an arrangement direction of the reflecting portion and the non-reflecting portion of the scale.

If an inspection target to which the scale is attached moves, two sine waves which are substantially orthogonal to each other (hereinafter, referred to as a sine wave signal and a cosine wave signal) are output from the light receiving element attached to a stator in response to a change in a position or an angle of the inspection target. An arctangent operation (Arctan) is performed on the sine wave signal and the cosine wave signal to obtain an angle in one signal period, and the position or the angle of the inspection target is calculated from the number of signal periods and the obtained angle.

A movement of the inspection target is generated by a drive system. The drive system is, for example, a linear drive system using a ball screw drive or a rotary drive system using a rotary motor. The former is generally referred to as a linear encoder because it has a mechanism using a long linear scale, and the latter is generally referred to as a rotary encoder because it has a mechanism using a circular scale.

However, a relationship between a scale and a light receiving element may be reversed, and the light receiving element may be attached to the inspection target, and the scale may be attached to the stator.

In addition to the above, there are encoders based on different detection principles, such as an optical encoder which receives transmitted light and non-transmitted light and a magnetic encoder. However, the mechanism for performing the arctangent operation on the sine wave signal and the cosine wave signal to obtain an angle in one signal period and measuring the position or the angle of the inspection target from the number of signal periods and the obtained angle is the same.

Figure 1:
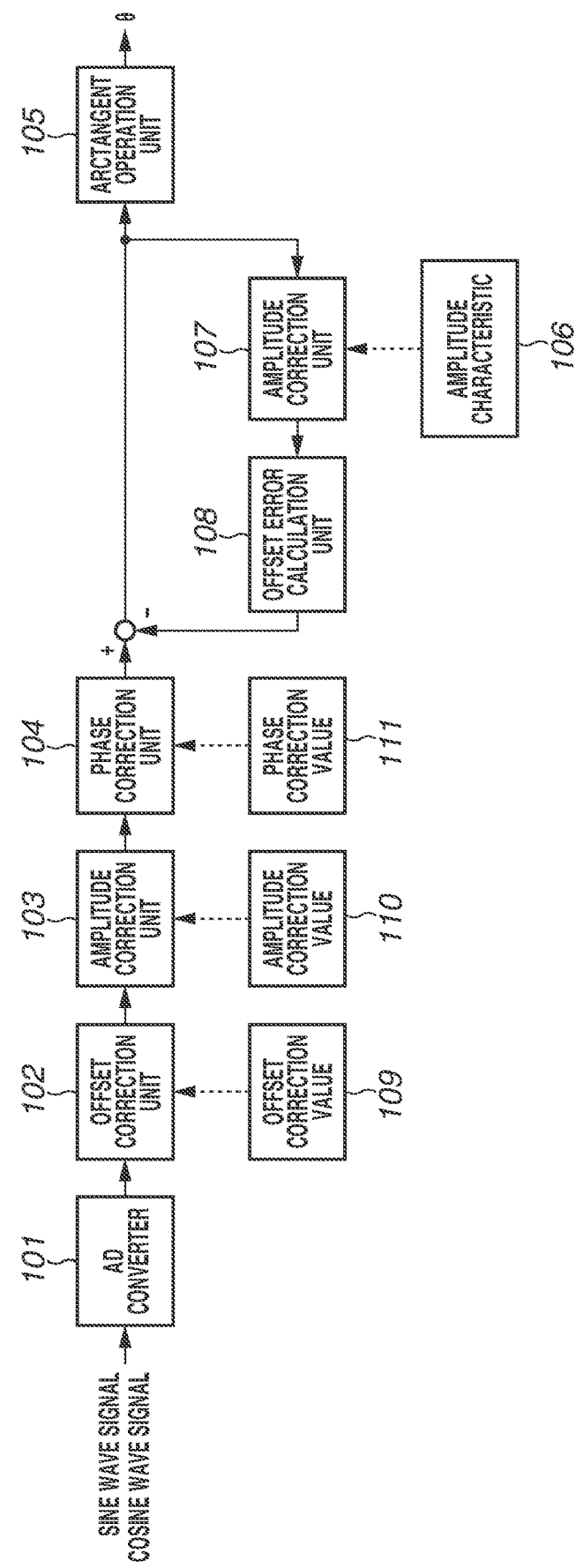
FIG. 1 illustrates a processing unit according to a first exemplary embodiment.
Figure 2:
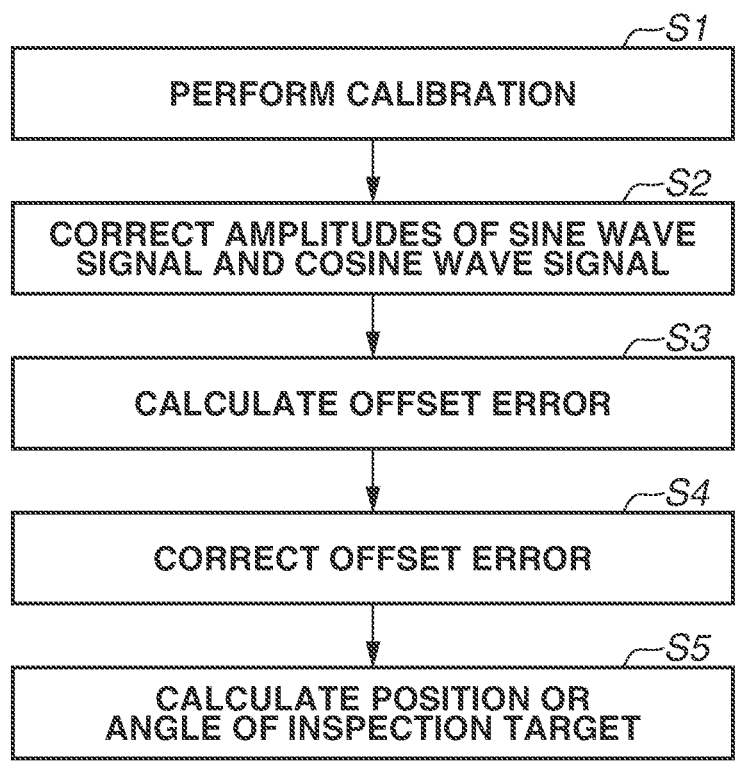
FIG. 2 is a flowchart illustrating processing performed by the processing unit.

FIG. 1 is a block diagram illustrating a processing unit (information processing apparatus) in which an analog sine wave signal and an analog cosine wave signal output from an encoder are converted into an angle. FIG. 2 is a flowchart illustrating processing of the processing unit. The processing unit includes an electrical circuit, a processor, and a memory. The processor (information processing apparatus) reads a program stored in the memory and executes a method illustrated in the flowchart in FIG. 2.

First, the analog sine wave signal and the analog cosine wave signal output from the encoder, which have already been amplified to signal amplitudes matching an input range of an analog-to-digital (AD) converter 101, are input to the AD converter 101 and converted into digital signals.

Figure 3:
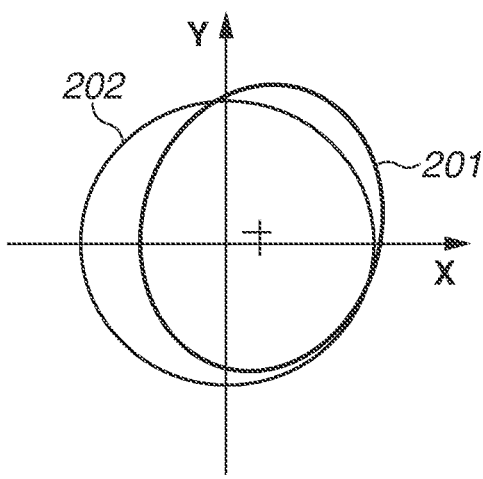
FIG. 3 illustrates Lissajous waveforms before and after correction by calibration.

Regarding the sine wave signal and the cosine wave signal converted into the digital signals, in a case where a Lissajous circle is drawn with the sine wave signal as X and the cosine wave signal as Y, the Lissajous circle to be obtained generally has a center which does not match (0, 0) and a shape which is not a perfect circle, as indicated by a circle 201 illustrated in FIG. 3.

The center of the Lissajous circle does not match (0, 0) because each of the sine wave signal and the cosine wave signal includes an offset error. The offset error occurs in a case where there is an error in a reference voltage of the electrical circuit inside the encoder.

The shape of the Lissajous circle is not a perfect circle because the sine wave signal and the cosine wave signal each include errors such as an amplitude error and a phase error in addition to the offset error. The amplitude error occurs, for example, in a case where a light-receiving sensitivity of the light receiving element for the sine wave signal does not match a light-receiving sensitivity of the light receiving element for the cosine wave signal and in a case where there is a difference in amplification performances between an analog amplifier for the sine wave signal and an analog amplifier for the cosine wave signal provided inside the encoder. In a case where amplitudes of the sine wave signal and the cosine wave signal are different, a Lissajous circle becomes elliptical in a direction orthogonal to XY axes, such as a Lissajous circle which is an ellipse long in an X axis direction or an ellipse long in a Y axis direction. The phase error occurs, for example, in a case where there is a dimension error in an arrangement of the plurality of light receiving portions provided in the light receiving element. If the arrangement includes the dimension error, the sine wave signal and the cosine wave signal cannot be output with a phase of 90 degrees. If there is the phase error, a Lissajous circle becomes elliptical in a diagonal direction of 45 degrees with respect to the XY axes.

As described above, the sine wave signal and the cosine wave signal converted into the digital signals include the offset error, the amplitude error, and the phase error. If the arctangent operation is performed on the sine wave signal and the cosine wave signal which include the above-described errors, measurement accuracy of the position or the angle of the inspection target is deteriorated.

Therefore, three correction blocks namely an offset correction unit 102, an amplitude correction unit 103, and a phase correction unit 104 are provided in a subsequent stage of the AD converter 101.

The three correction blocks correct the sine wave signal and the cosine wave signal using a correction value stored in the memory. The correction value is acquired in a calibration process S1 which is executed by a command from the processing unit.

The calibration process is described in detail with reference to a flowchart in FIG. 4. The calibration process is started by an operator's operation or a sequence which is automatically executed immediately after the power is turned on, and is executed by a calculation circuit or the processor. In step S901, if the calibration process is started, the drive system drives an inspection target at low speed at which frequencies of the sine wave signal and the cosine wave signal output from the encoder become sufficiently low with respect to a sampling frequency of the AD converter 101.

Then, the sine wave signal and the cosine wave signal output from the encoder are input to the AD converter 101 and converted into digital data.

Next, in step S902, a maximum (MAX) value and a minimum (MIN) value of each of the sine wave signal and the cosine wave signal, which are converted into the digital data by the AD converter 101 during the calibration process, are measured. The measured MAX value and MIN value of the sine wave signal are averaged, and an offset error of the sine wave signal is calculated. Further, the measured MAX value and MIN value of the cosine wave signal are averaged, and an offset error of the cosine wave signal is calculated. In other words, the processes are equivalent to measuring central coordinates of a Lissajous circle in a case where the Lissajous circle is drawn with the sine wave signal as X and the cosine wave signal as Y. Then, the offset error of the sine wave signal is stored in the memory as an offset correction value of the sine wave signal. The offset error of the cosine wave signal is stored in the memory as an offset correction value of the cosine wave signal.

Then, in step S903, an amplitude of the sine wave signal is calculated by subtracting the MIN value from the MAX value of the sine wave signal which is already measured. Further, an amplitude of the cosine wave signal is calculated by subtracting the MIN value from the MAX value of the cosine wave signal which is already measured. In other words, the processes are equivalent to measuring diameters of the Lissajous circle in the X axis direction and in the Y axis direction in a case where the Lissajous circle is drawn with the sine wave signal as X and the cosine wave signal as Y. Then, a value obtained by dividing an ideal amplitude value by the amplitude of the sine wave signal is stored in the memory as an amplitude correction value of the sine wave signal. A value obtained by dividing an ideal amplitude value by the amplitude of the cosine wave signal is stored in the memory as an amplitude correction value of the cosine wave signal.

Then, in step S904, the sine wave signal and the cosine wave signal which have been converted into the digital data by the AD converter 101 during the calibration process are converted into a sum signal by adding the sine wave signal and the cosine wave signal. Further, the sine wave signal and the cosine wave signal which have been converted into the digital data by the AD converter 101 are converted into a difference signal by subtracting the cosine wave signal from the sine wave signal. Then, a MAX value and a MIN value of the sum signal are measured. Further, a MAX value and a MIN value of the difference signal are measured. Then, an amplitude of the sum signal is calculated by subtracting the MIN value from the MAX value of the sum signal. An amplitude of the difference signal is calculated by subtracting the MIN value from the MAX value of the difference signal. In other words, the processes are equivalent to measuring diameters of the Lissajous circle in the diagonal direction of 45 degrees with respect to the X axis and in the diagonal direction of 45 degrees with respect to the Y axis in a case where the Lissajous circle is drawn with the sine wave signal as X and the cosine wave signal as Y.

In step S905, a value obtained by dividing the calculated amplitude value of the sum signal by the calculated amplitude value of the difference signal is stored in the memory as a phase correction value.

Next, a method is described in which the offset correction unit 102, the amplitude correction unit 103, and the phase correction unit 104 correct the sine wave signal and the cosine wave signal using the correction value stored in the memory.

The offset correction unit 102 subtracts an offset correction value 109 stored in the memory from the sine wave signal and the cosine wave signal input to the offset correction unit 102, and then outputs the resulting signals to the amplitude correction unit 103.

The amplitude correction unit 103 multiplies each of the sine wave signal and the cosine wave signal input to the amplitude correction unit 103 by an amplitude correction value 110 stored in the memory and then outputs the resulting signals to the phase correction unit 104.

The phase correction unit 104 converts the sine wave signal and the cosine wave signal which are input to the phase correction unit 104 into the sum signal by adding the signals. The phase correction unit 104 also converts the signals into the difference signal by subtracting the cosine wave signal from the sine wave signal which are input to the phase correction unit 104. Then, the phase correction unit 104 multiplies the difference signal by a phase correction value 111 stored in the memory to match the amplitudes of the sum signal and the difference signal with each other. The sum signal and the difference signal are orthogonal to each other. However, due to an influence of conversion into the sum signal and the difference signal, phases of the sum signal and the difference signal are rotated by 45 degrees with respect to the sine wave signal and the cosine wave signal input to the phase correction unit 104. Thus, the phase correction unit 104 further multiplies the corrected sum signal and difference signal by a rotation matrix having a phase of 45 degrees to return the phases, and then outputs the resulting signals.

Regarding the sine wave signal and the cosine wave signal which have been corrected in the above-described three correction blocks, in a case where a Lissajous circle is drawn with the sine wave signal as X and the cosine wave signal as Y, a circle 202 illustrated in FIG. 3 is obtained. In other words, the center of the circle 202 approaches (0, 0), and the Lissajous circle is corrected to a shape close to a perfect circle.

Then, an arctangent operation unit 105 performs the arctangent operation on the corrected sine wave signal and cosine wave signal and calculates an angle in one signal period.

In a case where the position or the angle of the inspection target is measured while the inspection target is driven, the frequencies of the sine wave signal and the cosine wave signal change based on a movement speed of the inspection target. A signal transmission path generally has a loss and is provided with a low-pass filter for removing a noise. Due to influences of the loss and the low-pass filter, the amplitudes of the sine wave signal and the cosine wave signal change depending on the movement speed of the inspection target.

Figure 5A:
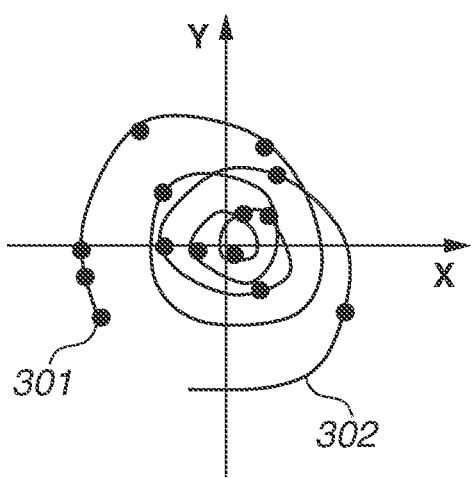
FIGS. 5A and 5B illustrate Lissajous waveforms before and after amplitude correction based on a movement speed.

For example, a Lissajous waveform of the sine wave signal (X) and the cosine wave signal (Y) acquired during rapid acceleration, deceleration, and reverse operations in a state in which temperature is stabilized and there is no change in the offset error is as illustrated in FIG. 5A due to an influence of the amplitude change depending on the movement speed of the inspection target. FIG. 5A illustrates black points 301 which indicate the sine wave signal and the cosine wave signal acquired in several reciprocating movements and a trajectory 302 of the sine wave signal and the cosine wave signal which is expected to be acquired over time. The Lissajous waveform is far from a perfect circle, and it is not possible to determine that there is no offset error. If the Lissajous waveform is deformed due to an amplitude decrease as in the above-described example, the offset error cannot be calculated correctly by the conventional method.

In a case where the drive system such as a galvano motor, which reverses a mirror at high speed and scans with laser light at high speed, generates heat by repeating rapid acceleration and deceleration, a temperature change is caused in a built-in encoder. If the temperature change is caused, the offset error changes with a change in an electrical characteristic such as a reference voltage. In particular, in a case where the drive system performs rapid acceleration and deceleration operations in response to a drive motion which is freely commanded, the temperature change is significant, and the offset error significantly changes.

Thus, in the first exemplary embodiment, an amplitude correction unit 107 and an offset error calculation unit 108 are provided to perform correction corresponding to the movement speed of the inspection target.

In step S2, the amplitude correction unit 107 corrects changes in the amplitudes of the sine wave signal and the cosine wave signal with the respective amplitude correction values corresponding to the movement speed of the inspection target using an amplitude characteristic 106 stored in the memory. In step S3, the offset error calculation unit 108 calculates the offset errors in the Lissajous waveform using the sine wave signal and the cosine wave signal the amplitudes of which are corrected. As described above, the amplitude change corresponding to the movement speed is corrected before the offset error is calculated.

Figure 7A:
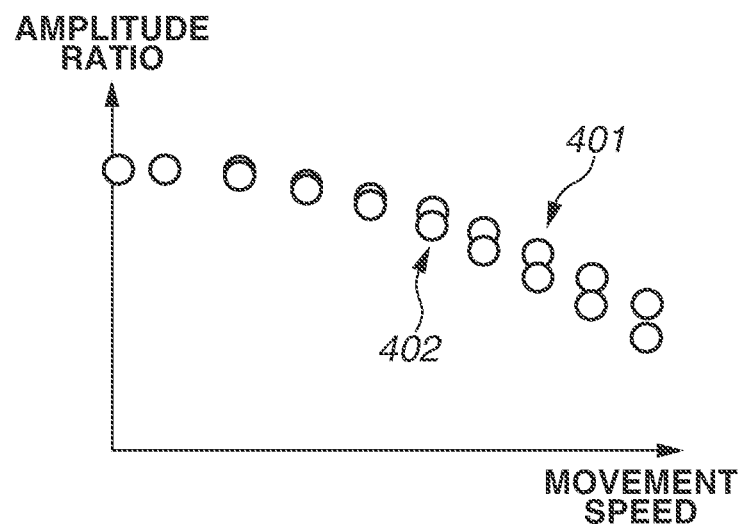
FIGS. 7A and 7B illustrate an amplitude ratio and an amplitude characteristic.
Figure 7B:
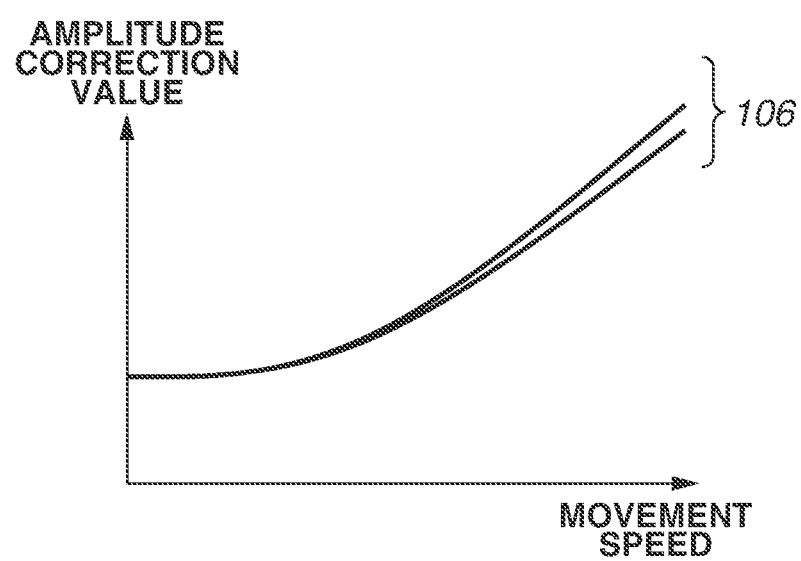

A method for acquiring the amplitude characteristic 106 is described in detail with reference to FIGS. 6, 7A, and 7B. FIG. 6 is a flowchart illustrating acquisition of the amplitude characteristic 106. FIGS. 7A and 7B respectively illustrate an amplitude ratio and an amplitude characteristic.

The acquisition of the amplitude characteristic 106 is started by a command from an operator or a sequence automatically executed after calibration, and executed by the calculation circuit and the processor.

In step S1001, if the acquisition of the amplitude characteristic 106 is started, the drive system reciprocates from one end to the other end of a movable range of the drive system (inspection target). At that time, the drive system (inspection target) is moved at a lower limit value of an operable speed or a first speed at which the amplitude decrease is negligible as a speed in a constant speed section. In step S1002, the sine wave signal and the cosine wave signal converted into the digital data by the AD converter 101 are acquired in the constant speed section. Then, the MAX values and the MIN values of the sine wave signal and the cosine wave signal are measured. Further, the amplitude of the sine wave signal is calculated by subtracting the MIN value from the MAX value of the sine wave signal. Furthermore, the amplitude of the cosine wave signal is calculated by subtracting the MIN value from the MAX value of the cosine wave signal.

Next, in step S1003, the drive system reciprocates from one end to the other end of the movable range thereof. At that time, the drive system (inspection target) is moved at a second speed which is slightly faster than the first speed as the speed in the constant speed section. In step S1004, the sine wave signal and the cosine wave signal converted into the digital data by the AD converter 101 are acquired in the constant speed section. Then, the MAX values and the MIN values of the sine wave signal and the cosine wave signal are measured. Further, the amplitude of the sine wave signal is calculated by subtracting the MIN value from the MAX value of the sine wave signal. Furthermore, the amplitude of the cosine wave signal is calculated by subtracting the MIN value from the MAX value of the cosine wave signal.

The above-described operations are repeated up to an upper limit value of the operable speed of the drive system while the speed in the constant speed section is sequentially increased. All the calculated amplitude values are normalized by an amplitude of the first speed to obtain an amplitude ratio 401 of the sine wave signal and an amplitude ratio 402 of the cosine wave signal illustrated in FIG. 7A. Then, the amplitude characteristics 106 are calculated by performing a polynomial approximation using inverse numbers of the amplitude ratios of the sine wave signal and the cosine wave signal and the movement speed of the inspection target as parameters. The amplitude characteristics 106 are illustrated in FIG. 7B. The amplitude characteristics 106 are stored in the memory as the amplitude correction values. In other words, information indicating a relationship between the movement speed of the inspection target and the amplitudes of the sine wave signal and the cosine wave signal is acquired in advance and stored in the memory.

Next, the amplitude correction unit 107 is described in detail. The amplitude correction unit 107 calculates a current movement speed of the inspection target from a value (the position or the angle of the inspection target) calculated by the arctangent operation unit 105. Further, the amplitude correction unit 107 obtains the amplitude correction values corresponding to the current movement speed of the inspection target using the amplitude characteristics 106 stored in the memory. Then, the amplitude correction unit 107 multiplies the sine wave signal and the cosine wave signal input to the amplitude correction unit 107 by the amplitude correction values corresponding to the current movement speed of the inspection target.

Figure 5B:
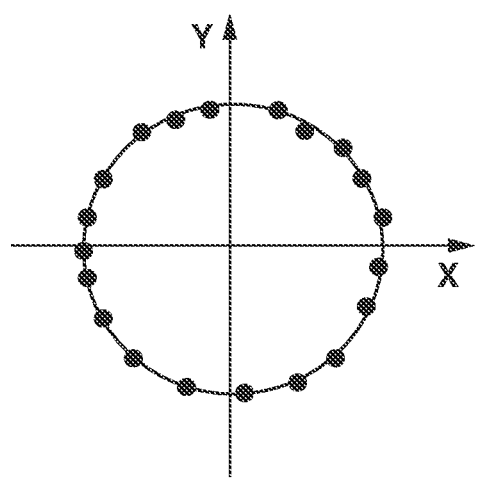

FIG. 5B illustrates a Lissajous waveform of the sine wave signal (X) and the cosine wave signal (Y) corrected by the amplitude correction unit 107. As illustrated in FIG. 5B, the Lissajous waveform is corrected to have a shape close to a perfect circle compared with the Lissajous waveform in FIG. 5A, and the offset error can be calculated.

Figure 8:
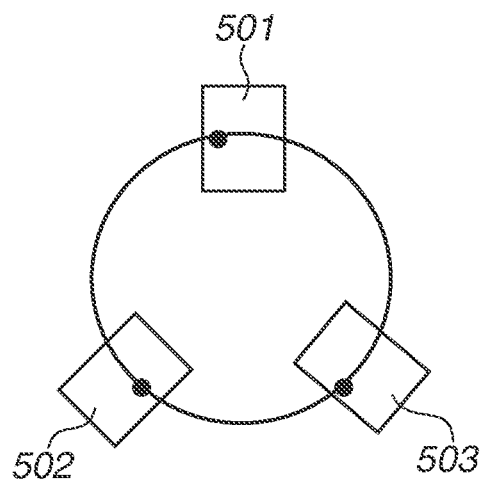
FIG. 8 illustrates sampling windows.

Next, the offset error calculation unit 108 is described. The sine wave signal and the cosine wave signal amplitudes of which are corrected by the amplitude correction unit 107 are input to the offset error calculation unit 108. To calculate the offset errors with a desired accuracy, three windows 501, 502, and 503 (sampling ranges) are arranged at equal intervals on a Lissajous circle as illustrated in FIG. 8. The sine wave signal and the cosine wave signal are sampled in the windows 501, 502, and 503, and the offset errors are calculated using the sampled sine wave signals and cosine wave signals. The window is a range in which the sine wave signal and the cosine wave signal expressed by constraint inequalities such as XMIN≤the sine wave signal≤MAX and YMIN≤the cosine wave signal≤MAX can be acquired. The three windows are arranged at equal intervals because offset error calculation accuracy of the sine wave signal and offset error calculation accuracy of the cosine wave signal are to be equal.

As described above, at least three sampling ranges are set in one period of the sine wave signal and the cosine wave signal the amplitudes of which are corrected with the amplitude correction values, and the offset errors are calculated using the sine wave signals and the cosine wave signals acquired in the sampling ranges.

Figure 9:
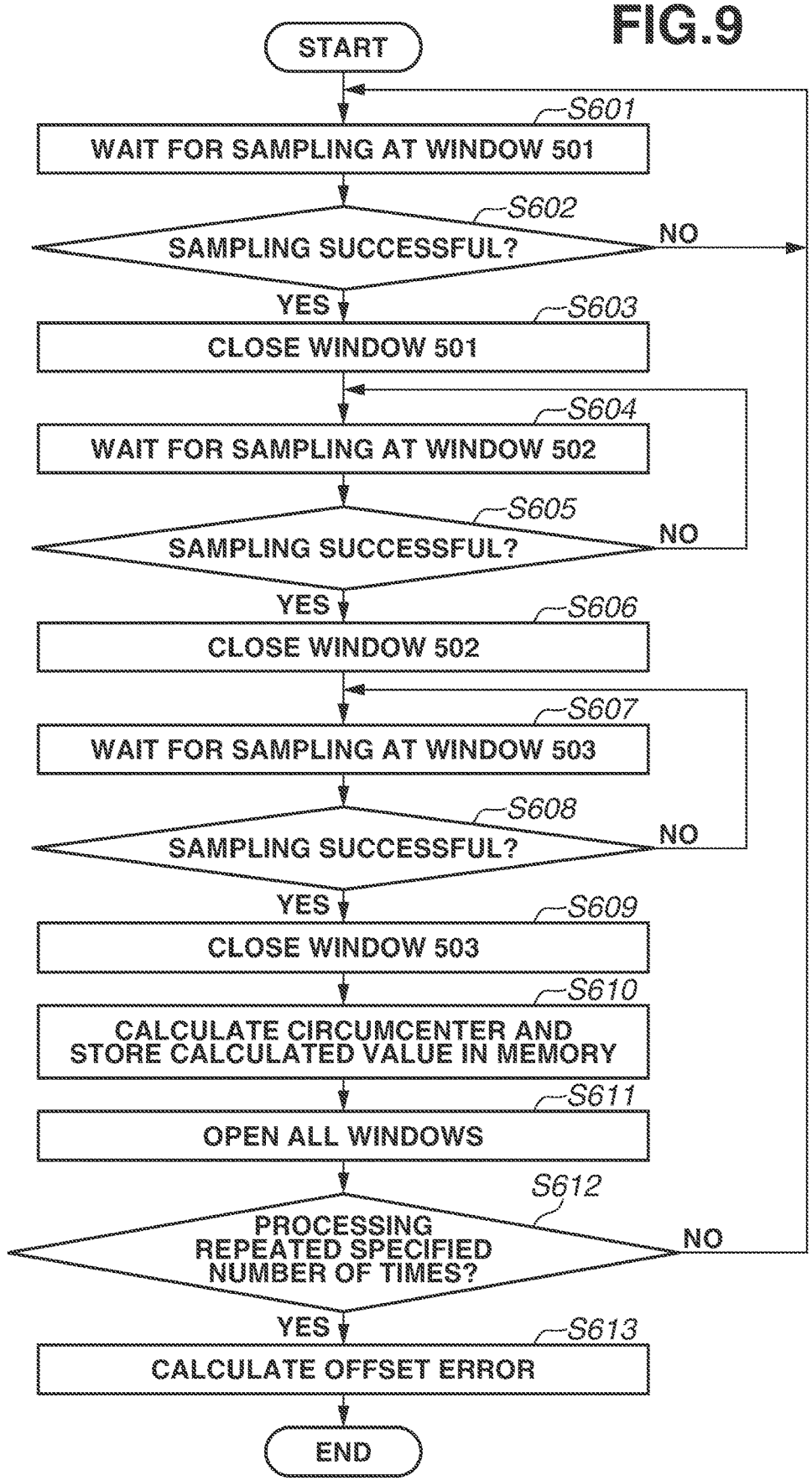
FIG. 9 is a flowchart illustrating offset error calculation.

The details of the process is described with reference to a flowchart in FIG. 9. In step S601, at the time of start of the offset error calculation, the window 501 is in a state of waiting for sampling. In step S602, in a case where the inspection target moves at high speed, sampling will succeed if it continuously waits for sampling even in a state in which a few points can be sampled per period of the sine wave signal and the cosine wave signal. If the sampling is successful (YES in step S602), then in step S603, the window 501 is closed and brought into a state of not accepting sampling. Similarly, in steps S604 to S606, if the sampling in the window 502 is successful (YES in step S605), then in step S606, the window 502 is closed and brought into the state of not accepting sampling. Similarly, in steps S607 to S609, if the sampling in the window 503 is successful (YES in step S608), then in step S609, the window 503 is closed and brought into the state of not accepting sampling. In step S610, if all the windows are closed, a circumcenter is calculated using the three sets of sampled sine wave signal and cosine wave signal, the offset errors of the sine wave signal and the cosine wave signal are calculated, and results are stored in the memory. In step S611, all the windows are opened, and, in step S612, it is determined whether the processing in steps S601 to S611 has been repeated a specified number of times. If the processing in steps S601 to S611 has not been repeated the specified number of times (NO in step S612), the processing returns to step S601. If the processing in steps S601 to S611 has been repeated the specified number of times (YES in step S612), then in step S613, the calculated values stored in the memory are averaged, and an average offset error is calculated.

As described above, the offset errors are calculated a plurality of times using the sine wave signal and the cosine wave signal output from the encoder in a predetermined time, and a plurality of the offset errors is averaged. Repetition of the processing the specified number of times and averaging of the values in step S613 are performed so that the calculated value of the offset error is not affected by a random noise such as a white noise included in the value sampled in the window. The above-described method using the windows enables the offset error to be calculated with desired accuracy although a time required for calculating the offset error is indefinite.

In step S4, the offset error is corrected by subtracting the offset error calculated as described above from the output value of the phase correction unit 104. At that time, if a large offset error is subtracted at a time, position information and angle information become discontinuous, and in a case where a servo device is used, an impulsive force is applied to the inspection target in motion. To prevent such an event, the subtraction is performed at a preset subtraction speed. For example, in a case where a value calculated by the offset error calculation unit 108 is 100 mV, if the offset error of 100 mV is subtracted all at once, an impact will occur, so that 100 mV is subtracted, for example, at a speed of 1 mV/sec for 100 seconds. The subtraction speed is appropriately determined based on a characteristic of the drive system in such a manner that a low speed is set in a case where an impact should be avoided and a high speed is set in a case where the impact is acceptable. In a case where the low subtraction speed is set, a next offset error is calculated before the subtraction of an initially obtained offset calculated value is completed. In this case, the subtraction of the initially obtained offset calculated value is canceled, and the subtraction is performed using a newly calculated value.

The above-described amplitude correction unit 107 and offset error calculation unit 108 require a plurality of calculations and determinations. Thus, calculation processing from input of the sine wave signal and the cosine wave signal to the amplitude correction unit 107 to subtraction thereof from the output of the phase correction unit 104 takes time. However, this is not an issue since the above-described processing is performed not between the phase correction unit 104 and the arctangent operation unit 105 but in a branch circuit. In other words, calculation processing between the phase correction unit 104 and the arctangent operation unit 105 is prioritized. Accordingly, a time delay hardly increases in a period from when the sine wave signal and the cosine wave signal input from the encoder are converted into the digital data by the AD converter 101 to when an angle in one signal period is calculated by the arctangent operation unit 105.

A change in the offset error after calibration can be corrected using the above-descried method. Then, in step S5, the arctangent operation unit 105 performs the arctangent operation on the sine wave signal and the cosine wave signal the offset errors of which are corrected, and an angle $\theta$ in one signal period is calculated. The calculated angle $\theta$ corresponds to the position or the angle of the inspection target. Accordingly, even if the offset error after calibration changes, the position or the angle of the inspection target can be measured with high accuracy.

Figure 10:
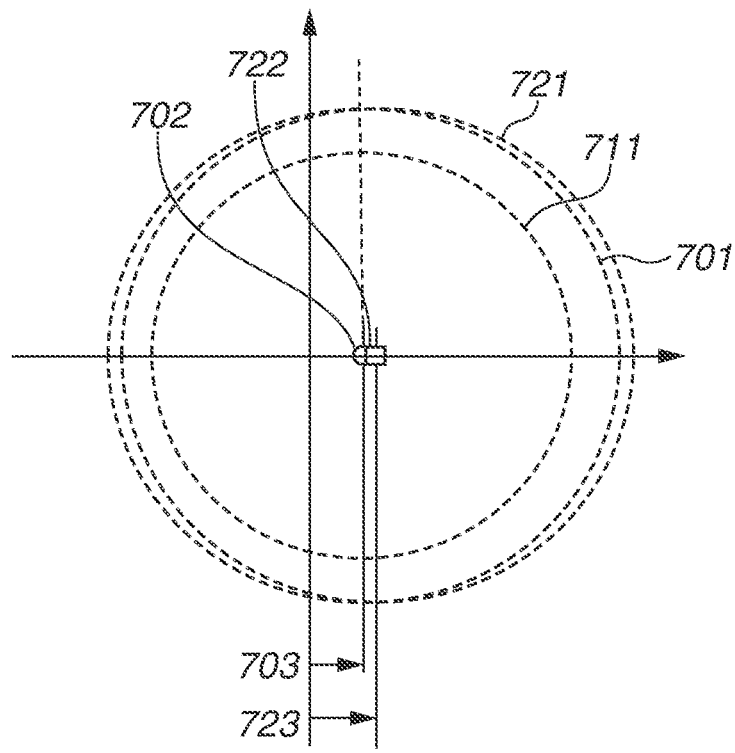
FIG. 10 illustrates amplitude correction and an offset error.

Next, an adverse effect in a case where an amplitude correction amount is too large is described. FIG. 10 illustrates a Lissajous waveform. A Lissajous circle 701 is obtained in a case where the inspection target is moved at low speed at which an amplitude decrease is negligible. The Lissajous circle 701 has a center 702. X and Y coordinates of the center 702 respectively correspond to the offset error of the sine wave signal and the offset error of the cosine wave signal. The offset error of the sine wave signal represents a value of a distance 703, and the offset error of the cosine wave signal is zero. The offset errors which are obtained in a case where the inspection target is moved at the speed at which the amplitude decrease is negligible match true values of the offset errors.

A Lissajous circle 711 is obtained in a case where the inspection target is moved at a speed at which the amplitude ratio is 0.8. The diameter of the Lissajous circle 711 is smaller than the diameter of the Lissajous circle 701, and the Lissajous circle 711 has the same center 702 as the Lissajous circle 701.

A Lissajous circle 721 is obtained by correcting the Lissajous circle 711, which is affected by the amplitude decrease, by the amplitude correction unit 107. An amplitude correction value of 1.25 times (=1/0.8) is applied to the Lissajous circle 711, and thus the Lissajous circle 721 is obtained. A center 722 of the Lissajous circle 721 does not match the center 702. The offset error of the sine wave signal is a distance 723. The distance 723 is longer than the distance 703 by the same magnification as the amplitude correction value.

As described above, the offset errors calculated by the method according to the present exemplary embodiment do not necessarily match the true values of the offset errors. This is because the amplitude correction unit 107 also multiplies the offset errors included in the sine wave signal and the cosine wave signal by the amplitude correction value. As described above, in the case of the amplitude correction value of 1.25 times, the offset error also becomes 1.25 times, and an offset calculation error of 25% is generated.

The offset calculation error is not an issue in a case where the amplitude correction value is less than twice, but becomes an issue in a case where the amplitude correction value is twice or more. This is because, in the case where the amplitude correction value is twice or more, the offset calculation error is 100% or more. If the offset errors are corrected using the sine wave signal and the cosine wave signal measured at the movement speed of the inspection target at which the amplitude correction value is twice or more, the offset errors are deteriorated compared with those before the correction.

For example, in a case where an offset error of a true value of 20 mV is applied to the sine wave signal and the cosine wave signal, if offset errors are calculated using the sine wave signal and the cosine wave signal the amplitudes of which are corrected using the amplitude correction value of three times, each of the offset errors is calculated as 60 mV. If the correction is performed using the calculated value, each of the corrected offset errors becomes −40 mV, and absolute values thereof become worse than those before the correction.

Thus, in a case where the sine wave signal and the cosine wave signal are measured at the movement speed of the inspection target at which the amplitude correction value is twice or more, the offset errors are not corrected using the sine wave signal and the cosine wave signal. Specifically, the amplitude correction unit 107 determines whether the input sine wave signal and cosine wave signal have been acquired at the movement speed at which the amplitude correction value is twice or more. If it is determined that the sine wave signal and the cosine wave signal have been acquired at the movement speed of the inspection target at which the amplitude correction value is twice or more, the amplitude correction unit 107 does not correct the amplitudes and does not output the signals to the offset error calculation unit 108.

In the present exemplary embodiment, a change in the offset errors of the sine wave signal and the cosine wave signal corresponding to the movement speed of the inspection target can be appropriately corrected. Accordingly, the position or the angle of the inspection target can be calculated with high accuracy using the sine wave signal and the cosine wave signal the offset errors of which are corrected.

Regarding the above-described offset error calculation unit 108, the method is described in which the windows 501, 502, and 503 are provided at three locations arranged at equal intervals on the Lissajous circle as illustrated in FIG. 8, and the offset errors are calculated using the sine wave signal and the cosine wave signal sampled in the windows. The method is an example, and a calculation method is not limited in the present exemplary embodiment. For example, the number of windows is not limited to three. A large number of windows, e.g., more than ten windows, may be provided, and a process for selecting three windows from the plurality of windows and calculating a circumcenter may be performed for all the combinations of the windows, and then, the offset error may be calculated by averaging calculated values. For example, in a case where four windows are provided, there are four combinations for selecting three windows therefrom. Thus, circumcenter calculation is performed four times, and the calculated values are averaged.

The offset errors may be calculated by performing least squares circle fitting with respect to the sine wave signals and the cosine wave signals sampled in the plurality of windows. In a case where offset calculation accuracy may be different for the sine wave signal and the cosine wave signal, it is not necessary to arrange windows at equal intervals on a Lissajous circumference. Further, a procedure for sampling in the order of the windows 501, 502, and 503 has been described, but sampling may be performed in reverse order or in random order.

The offset errors may be calculated by a method without providing a window. For example, if the sine wave signal and the cosine wave signal which are sampled for a sufficiently long time are used, the same method as the above-described one for acquiring the offset correction values by the calibration may be used. In other words, the offset errors can be calculated with high accuracy even by the method for calculating the offset errors using the MAX value and the MIN value of the sine wave signal and the MAX value and the MIN value of the cosine wave signal. More specifically, the offset error of the sine wave signal is calculated using the maximum value and the minimum value of the sine wave signal the amplitude of which is corrected with the amplitude correction value. Further, the offset error of the cosine wave signal is calculated using the maximum value and the minimum value of the cosine wave signal the amplitude of which is corrected with the amplitude correction value. In addition, for example, if the sine wave signal and the cosine wave signal which are sampled for a sufficiently long time are used, the offset errors can be calculated with high accuracy even by the method for performing calculation using the least squares circle fitting.

The amplitude correction unit 107 determines whether the input sine wave signal and cosine wave signal are acquired at the movement speed at which the amplitude correction value is twice or more to prevent the offset calculation error from increasing. However, the determination may be omitted in a case where it is clear that the drive system does not move at the movement speed of the inspection target at which the amplitude correction value is twice or more, such as in a case where the movement speed of the inspection target is limited.

The sine wave signal and the cosine wave signal input to the AD converter 101 include the offset error, the amplitude error, and the phase error, so that the three correction blocks, namely the offset correction unit 102, the amplitude correction unit 103, and the phase correction unit 104 are provided. However, the errors and the correction method described as premises are merely examples, and the present exemplary embodiment is not limited to the above-described three correction blocks and their contents. For example, in a case where an error such as a harmonic is included, how the harmonic is corrected in a preceding stage of the amplitude correction unit 107 and the offset error calculation unit 108 does not limit the content of the disclosure.

In a case where the amplitude correction unit 107 calculates the amplitude correction value corresponding to the movement speed of the inspection target, the current movement speed of the inspection target may be acquired from a drive command value input to the drive system of the inspection target instead of acquiring the current movement speed from a calculated value of the arctangent operation unit 105.

The data obtained by performing polynomial approximation using the movement speed of the inspection target as a parameter is stored in the memory as the amplitude characteristic 106, but the data is not limited to the polynomial approximation data. For example, the data may be a look-up table of the movement speed and the amplitude correction value. Another correlated parameter may be used instead of the movement speed.

In the present exemplary embodiment, an optical encoder provided with a light source (light emitting element), a scale in which a reflecting portion and a non-reflecting portion are alternately arranged, and a light receiving element which receives reflected light from the scale is described as an example, but an optical encoder or a magnetic encoder adopting a method different from the above-described one may be used. Further, as long as a sine wave and a cosine wave are generated due to a movement of an inspection target and a position or an angle of the inspection target is measured based on an arctangent operation value, a measuring instrument different from the encoder, such as a laser interferometer, can exert a similar effect.

Figure 11:
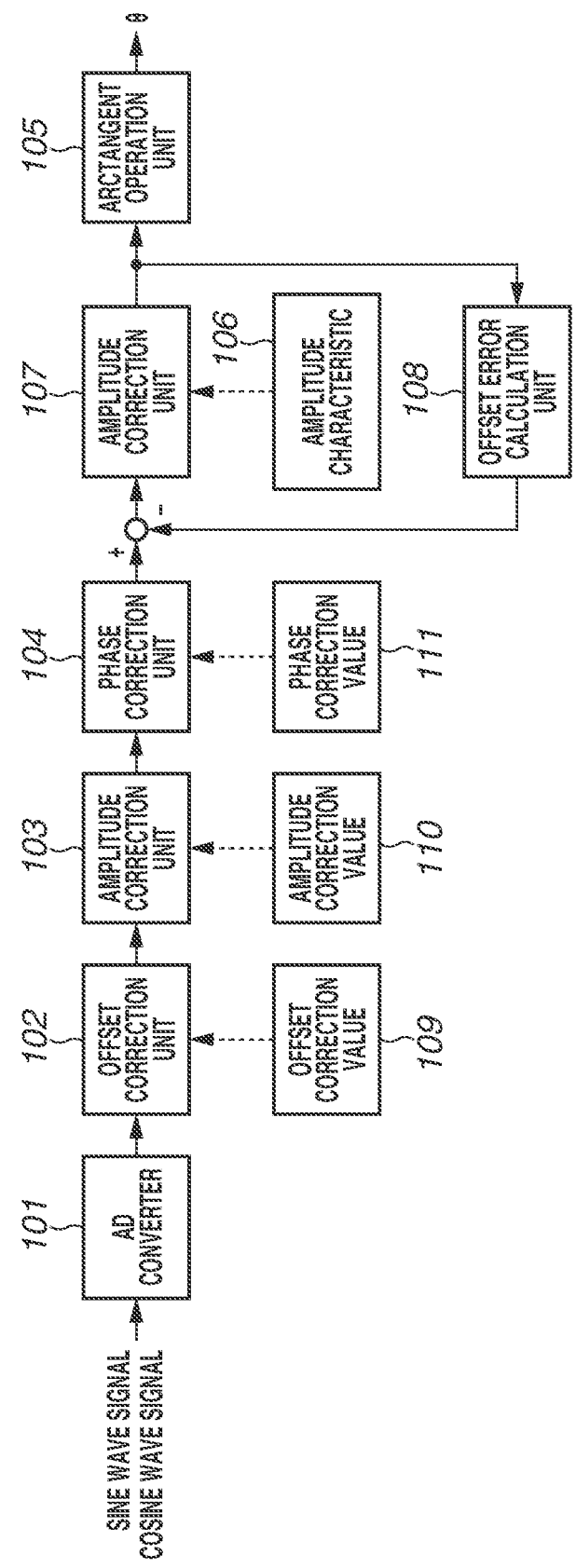
FIG. 11 illustrates a processing unit according to a second exemplary embodiment.

Next, a second exemplary embodiment is described. FIG. 11 is a block diagram illustrating a processing unit in which a sine wave signal and a cosine wave signal output from an encoder are converted into an angle θ.

In the first exemplary embodiment, the sine wave signal and the cosine wave signal input to the arctangent operation unit 105 are signals the amplitudes of which have not been corrected yet by the amplitude correction unit 107. The arctangent operation is performed on the sine wave signal and the cosine wave signal the amplitudes of which have not been corrected yet to calculate an angle in one signal period. On the other hand, in the second exemplary embodiment, a sine wave signal and a cosine wave signal input to the arctangent operation unit 105 are signals amplitudes of which have already been corrected by the amplitude correction unit 107. An arctangent operation is performed on the sine wave signal and the cosine wave signal the amplitudes of which have already been corrected to calculate an angle in one signal period.

Due to the above-described difference, for example, even in a case where amplitude changes in the sine wave signal and the cosine wave signal output from the encoder are different, the amplitudes of the sine wave signal and the cosine wave signal are corrected to be equal, and deterioration of calculation accuracy can be prevented. On the other hand, all the sine wave signals and the cosine wave signals input to the arctangent operation unit 105 are subjected to the amplitude correction, so that a calculation delay occurs between the phase correction unit 104 and the arctangent operation unit 105 as compared with the first exemplary embodiment. Therefore, the second exemplary embodiment is effective in a case where measurement accuracy is prioritized over a calculation delay.

Figure 12:
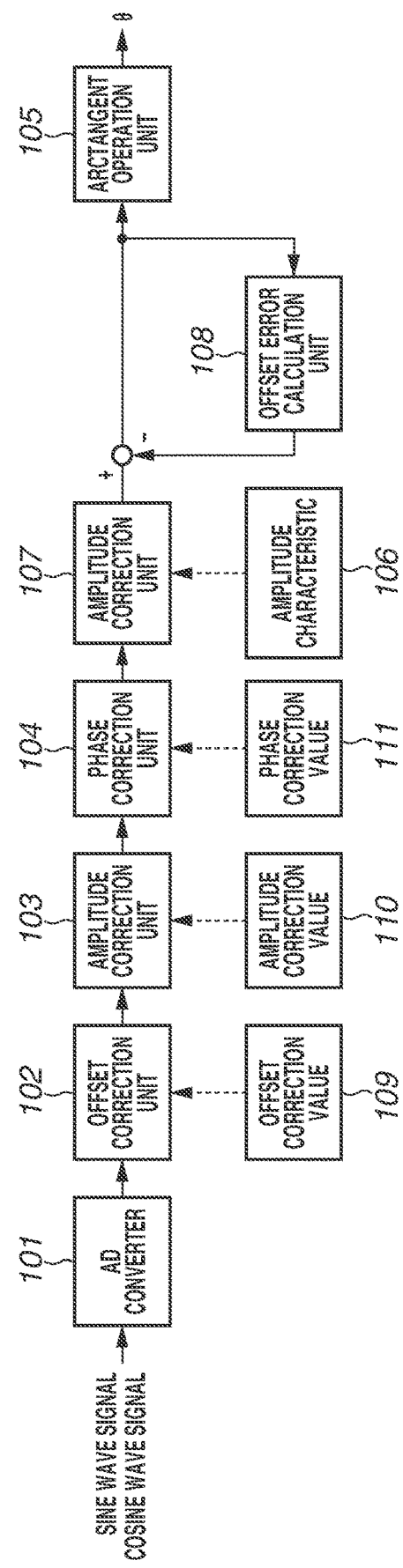
FIG. 12 illustrates a processing unit according to a third exemplary embodiment.

Next, a third exemplary embodiment is described. FIG. 12 is a block diagram illustrating a processing unit in which a sine wave signal and a cosine wave signal output from an encoder are converted into an angle θ.

The third exemplary embodiment is similar to the second exemplary embodiment in that a sine wave signal and a cosine wave signal input to the arctangent operation unit 105 are signals amplitudes of which have been corrected by the amplitude correction unit 107.

However, in the second exemplary embodiment, an offset error calculated by the offset error calculation unit 108 is subtracted from a signal an amplitude of which has not been corrected yet by the amplitude correction unit 107. On the other hand, in the third exemplary embodiment, an offset error calculated by the offset error calculation unit 108 is subtracted from a signal an amplitude of which has already been corrected by the amplitude correction unit 107.

Due to the above-described difference, the sine wave signal and the cosine wave signal input to the arctangent operation unit 105 are different from those according to the second exemplary embodiment. However, since the offset error is to be repeatedly calculated and corrected as a premise, the difference in the calculated value of the offset error is almost negligible. In other words, the third exemplary embodiment has almost the same effect as that of the second exemplary embodiment and is effective in a case where measurement accuracy is prioritized over a calculation delay as in the second exemplary embodiment.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-007471, filed Jan. 20, 2021, which is hereby incorporated by reference herein in its entirety.

What is claimed is:

1. A method for measuring a position or an angle of an inspection target based on a sine wave signal and a cosine wave signal output from an encoder or a laser interferometer, the method comprising:
   acquiring a temporary movement speed of the inspection target;
   calculating an amplitude correction value corresponding to the temporary movement speed using information representing a relationship between a movement speed of the inspection target and amplitudes of the sine wave signal and the cosine wave signal, the information being stored in a memory;
   correcting the amplitudes of the sine wave signal and the cosine wave signal using the amplitude correction value corresponding to the temporary movement speed in the information;
   calculating an offset error in a Lissajous waveform using the sine wave signal and the cosine wave signal the amplitudes of which are corrected with the amplitude correction value, the offset error indicting an offset of the Lissajous waveform from an origin when the Lissajous waveform is drawn with the sine wave signal and the cosine wave signal on Cartesian coordinates; and
   measuring the position or the angle of the inspection target using the offset error.

2. The method according to claim 1, wherein the position or the angle of the inspection target is measured using the sine wave signal and the cosine wave signal the offset errors of which are corrected.

3. The method according to claim 2, wherein the position or the angle of the inspection target is measured using (1) the sine wave signal and the cosine wave signal the offset errors of which are corrected and the amplitudes of which are not corrected or (2) the sine wave signal and the cosine wave signal the offset errors and the amplitudes of which are corrected.

4. The method according to claim 3, wherein the position or the angle of the inspection target is measured using the sine wave signal and the cosine wave signal which are corrected by repeatedly performing correction on the offset errors and the amplitudes.

5. The method according to claim 3, wherein the position or the angle of the inspection target is measured using the sine wave signal and the cosine wave signal which are corrected by repeatedly performing correction on the offset errors after the amplitudes are corrected.

6. The method according to claim 1, further comprising:
   determining whether the amplitude correction value corresponding to the temporary movement speed of the inspection target is less than twice the amplitude of the sine wave signal or the cosine wave signal; and
   correcting, in a case where it is determined that the amplitude correction value corresponding to the temporary movement speed of the inspection target is less than twice the amplitude of the sine wave signal or the cosine wave signal, the amplitudes of the sine wave signal and the cosine wave signal using the amplitude correction value.

7. The method according to claim 1,
wherein the offset error is calculated a plurality of times using the sine wave signal and the cosine wave signal output from the encoder in a predetermined time, and
wherein a plurality of offset errors is averaged.

8. The method according to claim 1,
wherein at least three sampling ranges are set in one period of the sine wave signal and the cosine wave signal the amplitudes of which are corrected with the amplitude correction value, and
wherein the offset error is calculated using the sine wave signal and the cosine wave signal acquired in each of the sampling ranges.

9. The method according to claim 1,
wherein the offset error of the sine wave signal is calculated using a maximum value and a minimum value of the sine wave signal the amplitude of which is corrected with the amplitude correction value, and
wherein the offset error of the cosine wave signal is calculated using a maximum value and a minimum value of the cosine wave signal the amplitude of which is corrected with the amplitude correction value.

10. A non-transitory storage medium storing a program for causing an information processing apparatus to execute a method for measuring a position or an angle of an inspection target based on a sine wave signal and a cosine wave signal output from an encoder or a laser interferometer, the method comprising:
acquiring a temporary movement speed of the inspection target;
calculating an amplitude correction value corresponding to the temporary movement speed using information representing a relationship between a movement speed and amplitudes of the sine wave signal and the cosine wave signal, the information being stored in a memory;
correcting the amplitudes of the sine wave signal and the cosine wave signal using the amplitude correction value corresponding to the temporary movement speed in the information;
calculating an offset error in a Lissajous waveform using the sine wave signal and the cosine wave signal the amplitudes of which are corrected with the amplitude correction value, the offset error indicting an offset of the Lissajous waveform from an origin when the Lissajous waveform is drawn with the sine wave signal and the cosine wave signal on Cartesian coordinates, and
measuring the position or the angle of the inspection target using the offset error.

11. The non-transitory storage medium according to claim 10, wherein the position or the angle of the inspection target is measured using (1) the sine wave signal and the cosine wave signal the offset errors of which are corrected or (2) the sine wave signal and the cosine wave signal the offset errors of which are corrected and the amplitudes of which are not corrected.

12. The non-transitory storage medium according to claim 10, further comprising:
determining whether the amplitude correction value corresponding to the temporary movement speed of the inspection target is less than twice the amplitude of the sine wave signal or the cosine wave signal; and correcting, in a case where it is determined that the amplitude correction value corresponding to the temporary movement speed of the inspection target is less than twice the amplitude of the sine wave signal or the cosine wave signal, the amplitudes of the sine wave signal and the cosine wave signal using the amplitude correction value.

13. The non-transitory storage medium according to claim 10,
wherein the offset error is calculated a plurality of times using the sine wave signal and the cosine wave signal output from the encoder in a predetermined time, and
wherein a plurality of offset errors is averaged.

14. The non-transitory storage medium according to claim 10,
wherein at least three sampling ranges are set in one period of the sine wave signal and the cosine wave signal the amplitudes of which are corrected with the amplitude correction value, and
wherein the offset error is calculated using the sine wave signal and the cosine wave signal acquired in each of the sampling ranges.

15. The non-transitory storage medium according to claim 10,
wherein the offset error of the sine wave signal is calculated using a maximum value and a minimum value of the sine wave signal the amplitude of which is corrected with the amplitude correction value, and
wherein the offset error of the cosine wave signal is calculated using a maximum value and a minimum value of the cosine wave signal the amplitude of which is corrected with the amplitude correction value.

16. An apparatus which measures a position or an angle of an inspection target based on a sine wave signal and a cosine wave signal output from an encoder or a laser interferometer, the apparatus comprising:
a processor,
wherein the processor is configured to:
acquire a temporary movement speed of the inspection target;
calculate an amplitude correction value corresponding to the temporary movement speed of the inspection target using information representing a relationship between a movement speed of the inspection target and amplitudes of the sine wave signal and the cosine wave signal, the information being stored in a memory;
correct the amplitudes of the sine wave signal and the cosine wave signal using the amplitude correction value corresponding to the temporary movement speed in the information; and
calculate an offset error in a Lissajous waveform using the sine wave signal and the cosine wave signal the amplitudes of which are corrected with the amplitude correction value, the offset error indicting an offset of the Lissajous waveform from an origin when the Lissajous waveform is drawn with the sine wave signal and the cosine wave signal on Cartesian coordinates, and
measure the position or the angle of the inspection target using the offset error.

17. The apparatus according to claim 16, wherein the processor further configured to:
determine whether the amplitude correction value corresponding to the temporary movement speed of the inspection target is less than twice the amplitude of the sine wave signal or the cosine wave signal; and
correct, in a case where it is determined that the amplitude correction value corresponding to the temporary movement speed of the inspection target is less than twice the amplitude of the sine wave signal or the cosine wave signal, the amplitudes of the sine wave signal and the cosine wave signal using the amplitude correction value.

18. The apparatus according to claim 16,
wherein the offset error is calculated a plurality of times using the sine wave signal and the cosine wave signal output from the encoder in a predetermined time, and
wherein a plurality of offset errors is averaged.

19. The apparatus according to claim 16,
wherein at least three sampling ranges are set in one period of the sine wave signal and the cosine wave signal the amplitudes of which are corrected with the amplitude correction value, and
wherein the offset error is calculated using the sine wave signal and the cosine wave signal acquired in each of the sampling ranges.

20. A system comprising:
an encoder or a laser interferometer; and
the apparatus according to claim 16.

* * * * *